(12) United States Patent
Lahajnar et al.

(10) Patent No.: US 11,277,050 B2
(45) Date of Patent: Mar. 15, 2022

(54) ELECTRIC MOTOR

(71) Applicant: KOLEKTOR GROUP D.O.O., Idrija (SI)

(72) Inventors: Franci Lahajnar, Cerkno (SI); Boris Jezersek, Godovic (SI); Borut Jeram, Cerkno (SI)

(73) Assignee: KOLEKTOR GROUP D.O.O., Idrija (SI)

( * ) Notice: Subject to any disclaimer, the term of this patent is extended or adjusted under 35 U.S.C. 154(b) by 134 days.

(21) Appl. No.: 16/566,006

(22) Filed: Sep. 10, 2019

(65) Prior Publication Data

US 2020/0006999 A1 Jan. 2, 2020

Related U.S. Application Data

(63) Continuation of application No. PCT/EP2018/055710, filed on Mar. 8, 2018.

(30) Foreign Application Priority Data

Mar. 10, 2017 (DE) ...................... 10 2017 105 089.2

(51) Int. Cl.
*H02K 5/08* (2006.01)
*H02K 5/173* (2006.01)
(Continued)

(52) U.S. Cl.
CPC .............. *H02K 5/08* (2013.01); *H02K 1/146* (2013.01); *H02K 1/276* (2013.01); *H02K 3/522* (2013.01);
(Continued)

(58) Field of Classification Search
CPC ........ F01M 13/04; H02K 11/33; H02K 15/12; H02K 1/146; H02K 1/276; H02K 21/16;
(Continued)

(56) References Cited

U.S. PATENT DOCUMENTS

| 6,538,353 B2* | 3/2003 | Marioni ................. H02K 1/148 |
|---|---|---|
| | | 310/86 |
| 8,115,353 B2* | 2/2012 | Urano ...................... H02K 3/18 |
| | | 310/71 |

(Continued)

FOREIGN PATENT DOCUMENTS

| CN | 2429959 Y | 5/2001 |
|---|---|---|
| CN | 104863865 A | 8/2015 |

(Continued)

OTHER PUBLICATIONS

International Search Report issued by the International Searching Authority for corresponding International Patent Application No. PCT/EP2018/055710, dated May 24, 2018.

*Primary Examiner* — Alex W Mok

(74) *Attorney, Agent, or Firm* — Myers Wolin, LLC

(57) ABSTRACT

An electric motor, especially for a fluid-handling system, comprises an external stator and an internal rotor mounted to rotate around an axis. The said external stator comprises a multiplicity of ferromagnetic pole pieces disposed around the axis and having winding cores extending substantially radially, an injection-molded plastic structure having a bushing and, molded thereon, winding supports enveloping the winding cores, as well as stator windings received on the winding supports. The bushing comprises a sleeve having a closed inner face extending radially inside the pole pieces and an end piece that closes the sleeve in the end region. The rotor is disposed inside the sleeve and mounted in a bearing disposed in the end piece.

17 Claims, 7 Drawing Sheets

(51) Int. Cl.
*H02K 21/16* (2006.01)
*H02K 1/14* (2006.01)
*H02K 3/52* (2006.01)
*H02K 1/27* (2006.01)
*H02K 5/15* (2006.01)
*H02K 11/33* (2016.01)
*H02K 1/276* (2022.01)
*F01M 13/04* (2006.01)

(52) U.S. Cl.
CPC ............ *H02K 5/15* (2013.01); *H02K 5/1735* (2013.01); *H02K 11/33* (2016.01); *H02K 21/16* (2013.01); *F01M 13/04* (2013.01); *H02K 2211/03* (2013.01)

(58) Field of Classification Search
CPC ...... H02K 2211/03; H02K 3/522; H02K 5/08; H02K 5/128; H02K 5/15; H02K 5/1735
USPC .......................................................... 310/43
See application file for complete search history.

(56) References Cited

U.S. PATENT DOCUMENTS

| | | | |
|---|---|---|---|
| 2004/0108779 A1* | 6/2004 | Boettger | H02K 5/15 310/89 |
| 2006/0175926 A1* | 8/2006 | Best | H02K 1/187 310/254.1 |
| 2006/0232143 A1 | 10/2006 | Purvines et al. | |
| 2013/0055771 A1 | 3/2013 | Tashiro et al. | |
| 2013/0264896 A1* | 10/2013 | Morita | C08K 3/22 310/51 |
| 2014/0319936 A1 | 10/2014 | Makino et al. | |
| 2015/0303752 A1* | 10/2015 | Siebald | H02K 15/10 310/43 |
| 2016/0226320 A1* | 8/2016 | Li | H02K 3/522 |
| 2016/0226339 A1* | 8/2016 | Niwa | H02K 5/225 |
| 2016/0261154 A1* | 9/2016 | Ishikawa | H02K 1/2766 |

FOREIGN PATENT DOCUMENTS

| | | | |
|---|---|---|---|
| CN | 205753683 U | 11/2016 | |
| DE | 10052797 A1 | 5/2002 | |
| DE | 10254670 A2 | 6/2004 | |
| DE | 102006049292 A1 | 4/2008 | |
| DE | 102008043386 A1 | 5/2010 | |
| DE | 102013105962 A1 | 12/2014 | |
| DE | 102015000769 A1 | 1/2015 | |
| DE | 202015008207 U1 | 2/2016 | |
| DE | 102014114667 A1 | 4/2016 | |
| EP | 0612139 A2 * | 8/1994 | ........... H02K 15/095 |
| EP | 1281229 B1 | 2/2004 | |
| EP | 1422809 A2 | 5/2004 | |
| GB | 1485059 | 9/1977 | |
| JP | 2013-215023 A | 10/2013 | |
| WO | 2016203592 A1 | 12/2016 | |

* cited by examiner

ELECTRIC MOTOR

CROSS REFERENCE TO RELATED APPLICATIONS

This application is a continuation under 35 U.S.C. § 120 of International Application PCT/EP2018/055710, filed Mar. 8, 2018, which claims priority to German Application No. 10 2017 105 089.2, filed Mar. 10, 2017, the contents of each of which are incorporated by reference herein.

FIELD OF THE INVENTION

The present invention relates to an electric motor. In particular, the present invention relates to an electric motor of the internal-rotor type, i.e. an electric motor having an external stator and an internal rotor mounted to rotate around an axis.

BACKGROUND

Electric motors are known in a literally unimaginable variety of different constructions and designs. They are found as internal-rotor and external-rotor motors, as pancake motors, and as a.c. and d.c. motors, the lateral with mechanical or electronic commutation, etc. etc. Thus the choice of electric motor most suitable for a particular application is typically based on diverse different viewpoints and criteria. For example, due consideration must be given to the existing voltage supply, the needed motor operating characteristic (motor characteristic), the existing available space, the cost situation, whether electromagnetic compatibility EMC is required, the existing cooling situation, etc.

DE 10052797 A1 discloses a radial pump having a pump head, the impeller of which is driven by an electric motor of the class in question here. That electric motor is contained in a pot-shaped motor housing; its stator is attached to the bottom of the motor housing. Opposite its bottom, the motor housing is closed by a pump housing, which has an intake nozzle and together with an insert received therein defines the space for the impeller. Via its shaft, the motor rotor is mounted on the one hand on the bottom of the motor housing and on the other hand in the insert of the pump head. By means of an annular prolongation extending beyond its bottom, the motor housing forms a receiving space, closed by a cover, for the motor controller and other electronic components.

SUMMARY

The present invention has as an objective providing an electric motor that is much more suitable for the drive of a fluid-handling system (for example, an oil separator in a motor vehicle) and—while permitting inexpensive manufacture—satisfies the requirements then applicable in various respects in excellent manner.

This stated object is achieved by an electric motor of internal-rotor type, which is characterized by the following features acting together in combination: The outer stator comprises a multiplicity of ferromagnetic pole pieces disposed around the axis and having winding cores extending substantially radially, an injection-molded plastic structure having a bushing and, molded thereon, winding supports enveloping the winding cores, as well as stator windings received on the winding supports. The bushing comprises a sleeve having a closed inner face extending radially inside the pole pieces and an end piece that closes the sleeve in the end region. The rotor is disposed inside the sleeve and mounted in a bearing disposed in the end piece.

Accordingly, a central feature of the electric motor consists in a complex plastic structure injection-molded onto the pole pieces and inherently combining multiple functionalities. This comprises at least one bushing and, molded thereon, the winding supports enveloping the winding cores (the pole pieces), wherein the bushing in turn comprises a sleeve having a closed, typically cylindrical inner face extending radially inside the pole pieces and an end piece that closes the sleeve in the end region. By virtue of the closed inner face of the sleeve and of the end piece closing it in the end region, the said bushing of the plastic structure is suitable for a durably and absolutely reliable sealed boundary between two regions of the external stator, namely that (internal) region in which the internal rotor is disposed, and that (external) region in which the stator-side windings, wound around the winding supports, are situated. Such hermetic encapsulation of the rotor space in turn permits in particular integration of the electric motor into the respective application as well as a corresponding mode of operation of the electric motor in which the rotor is circumcirculated by a fluid, which specifically is that fluid on which a system (for example, an oil separator of a motor vehicle) driven by the electric motor acts. Thus the requirement of a hermetic seal between that system and the rotor of the electric motor is obviated. The possibility exists of effective cooling of the electric motor by the fluid circulating inside the bushing (in the rotor space). In addition, if the fluid is suitable, it may contribute to lubrication of the rotor bearing. According to the present invention, this takes place by means of a bearing disposed in the end piece of the bushing. On the other hand, the outer region of the stator, in which the stator windings in particular are found, does not come into contact with any fluid. The mounting of the rotor on the end piece of the bushing of the plastic structure additionally permits particularly inexpensive manufacture of the electric motor. Beyond this, the complex plastic structure is capable of assuming still further different functionalities, as will become evident from the explanations hereinafter.

As regards the functionalities imparted to it, the plastic structure preferably consists of a thermosetting material, particularly preferably of thermosetting epoxy. In this connection, specifically, the loadability of the plastic structure needed for mounting of the rotor may already be achieved with relatively small wall thicknesses, which favors the realization of comparatively compact and lightweight electric motors according to the inventive concept.

According to another preferred further development of the present invention, at least two bracing projections, on which a printed-circuit board having an electronic motor controller is fixed, are disposed on the end piece. The said printed-circuit board extends preferably transversely relative to the axis of the motor, close to the end face of the end piece. This is particularly favorable in view of establishment of reliable contacting, with little complexity, between the stator-side windings and the printed-circuit board. In this connection, a quite particularly preferred further development of the invention is characterized in that receptacles for electrical contact points are molded onto the end piece. Specifically, those receptacles—and accordingly the contact points inserted into them—may each be aligned with an intermediate space between two pole pieces for this purpose. And the contact points are preferably configured in U-shape, so that the winding wire between two stator windings to be applied on winding supports adjacent to one another is routed through the U-shaped contact point. It is then particularly favorable when the contact points have one limb tapering to a contact pin, wherein the contact pins are contacted with the printed-circuit board.

Another preferred further development of the invention is characterized in that the pole pieces are surrounded in the radially outer region by a neutral ring contacting them and extending perpendicularly relative to the axis. Preferably the said neutral ring—which particularly preferably is joined together as a stack of annular laminations—is connected to a pin-shaped neutral contact. For its guidance, the end piece of the plastic structure is provided particularly preferably with a specific bracing element. By means of this, the neutral contact is positioned in such a way that, when the printed-circuit board is placed on the bracing projections, explained in the foregoing (in addition to contacting of the contact points), of the end piece, an electrical connection to the neutral contact may also be established.

According to another preferred further development of the invention, the pole pieces are T-shaped in the radially outer region. This permits a large-surface transition from the pole pieces to the neutral ring. Between each of the said T-shaped ends ("heads") of pole pieces adjacent to one another, a gap exists that permits application of the windings on the winding supports (from outside) by use of the needle winding technique. In this sense, a gap that permits passage of the winding needle preferably also exists between each two end plates, adjacent to one another, in which the winding supports of the plastic structure preferably merge in the radially outer region or are formed onto the winding supports in the radially outer region.

According to yet another preferred further development of the invention, an insertion bushing, particularly preferably of stainless steel, is embedded in the bushing of the plastic structure. Hereby the static properties can be improved, wherein disadvantageous effects on the magnetic properties are simultaneously suppressed. This may also be favorable in certain applications with respect to optimum shielding, from the winding region of the stator, of the fluid streaming through the rotor space.

In the interests of particularly reliable sealing of the individual regions of the stator from one another (see above), it is further particularly advantageous when the sleeve is provided at the end face opposite the end piece with a sealing face or other sealing structure for direct connection to a system housing or other structural part of a system driven by the electric motor. For example, a circumferential groove for receiving an O-ring may be provided at the end face of the sleeve.

According to yet another preferred further development of the invention, the pole pieces are part of a continuous pole structure, in that they are joined to one another in the radially inner region, in the region of the prolongations, respectively via connecting webs. The said connecting webs have minimum cross sections, which are sufficient for shape stability of the pole structure but which form a great resistance for magnetic flux; thus the connecting webs between the individual pole pieces specifically have only short radial extent. With respect to the definitively simplified manufacture of the inventive electric motor, the disadvantage of a slightly reduced efficiency—due to leakage losses—is made tolerable. If the pole structure consists of a stack of laminations, as is the case in a preferred further development of the invention, only some of the laminations in a particularly preferred further development are annularly continuous, in that the individual pole-piece laminations are joined to one another via connecting webs; in contrast, in the other layers of the pole structure, respectively separate pole-piece laminations are provided, between which respectively an open space exists. Thus, in a pole structure consisting of a stack of laminations, it is possible, for example, that only every second, every third or every fourth lamination is formed in annularly continuous manner. Hereby the said leakage losses can be minimized. The said plastic structure that according to the invention is injection-molded onto the pole structure and fills the said open spaces between the individual laminations of the pole pieces ensures the integrity of the pole structure, even though only some of the laminations therein are provided with connecting webs and in this way are formed in annularly continuous manner. According to an alternative configuration, the individual annularly closed laminations of the pole structure may be thinner (by indentations or the like) in the region of each connecting web than in their other regions, so that an axial spacing exists respectively between the individual connecting webs of the annularly closed laminations of the pole structure joined together as a pole structure. A material particularly suitable for manufacture of the laminations of the pole structure is traditional "electric steel".

Yet another preferred further development of the invention is characterized in that the stator is provided with an injection-molded external body of plastic, injection-molded in situ onto the plastic structure, in which the plastic structure plus windings is embedded, as are also the neutral ring and the printed-circuit board if such are present. The external body injection-molded onto the unit, fabricated up to that point and comprising pole structure, plastic structure injection-molded onto it, stator windings applied on this as well as mounted neutral ring and attached printed-circuit board, further stiffens the stator. At the same time, it creates mechanical and chemical protection of the various components of the stator, for example against corrosion. Due to the stiffening function of the external body, the injection-molded (internal) plastic structure may be made correspondingly less sturdily, i.e. may be limited largely to the material thickness necessary for fulfillment of the properties essential during manufacture of the stator. This mutual stiffening of external body and plastic structure is particularly favored when both parts consist of a compatible material (especially thermosetting epoxy), so that external body and plastic structure are joined ideally to one another as one unit.

In yet another preferred further development of the present invention, the rotor has a core structure consisting of a stack of laminations. Particularly preferably, the said core structure consists of several openings, into which permanent magnets (preferably sintered) are inserted. Particularly preferably, the said core structure is also overmolded—at least partly, namely at the end face—with a plastic jacket. The material thereof is matched to the respective application, so that the plastic jacket achieves in particular protection of the core structure against chemical influences by the fluid circulating in the rotor space.

BRIEF DESCRIPTION OF THE DRAWING

The present invention will be explained in more detail hereinafter on the basis of a preferred exemplary embodiment illustrated in the drawing, wherein.

DETAILED DESCRIPTION OF THE PREFERRED EMBODIMENTS

Figure 1:
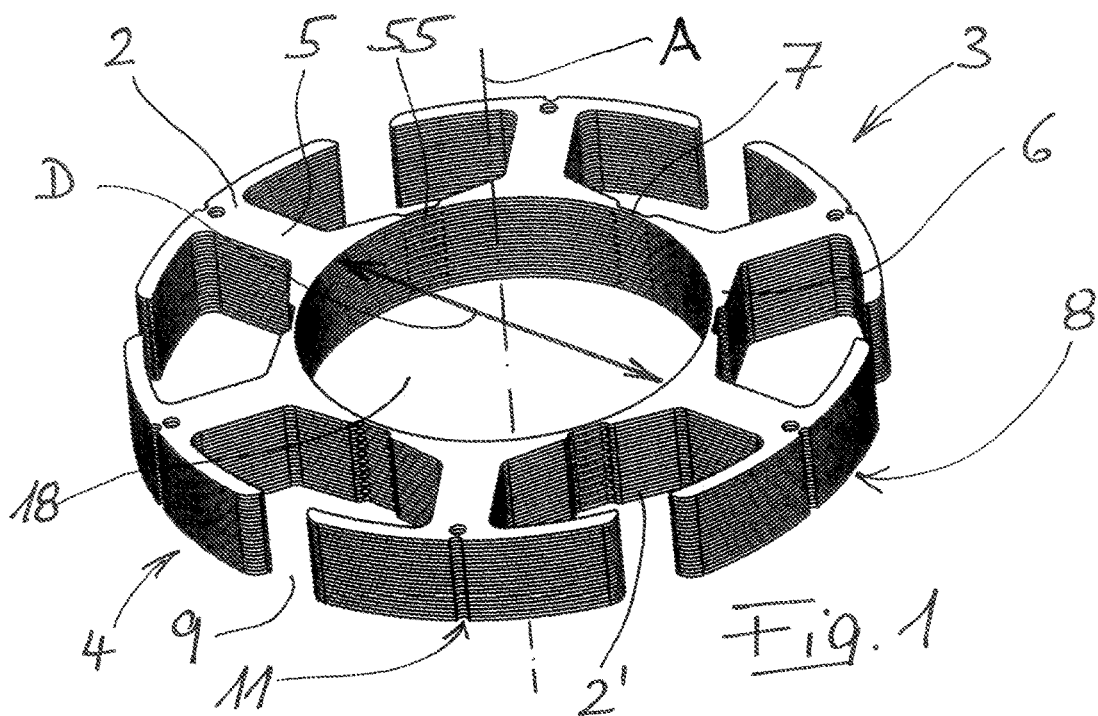
FIGS. 1-8 show the stator of an inventive electric motor on the basis of the steps of its manufacture and FIGS. 9-11 show the rotor suitable for interaction with the stator according to FIGS. 1-8 on the basis of the steps of its manufacture.
Figure 5:
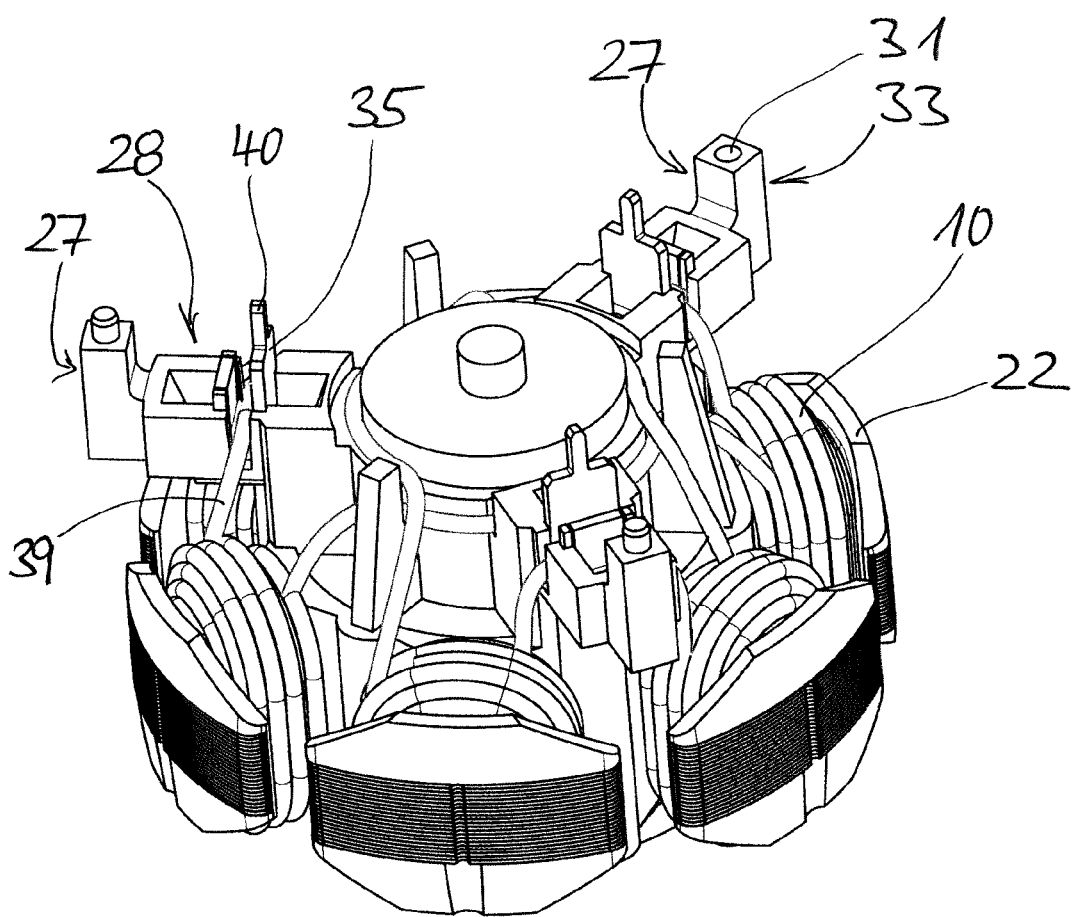
Figure 5:
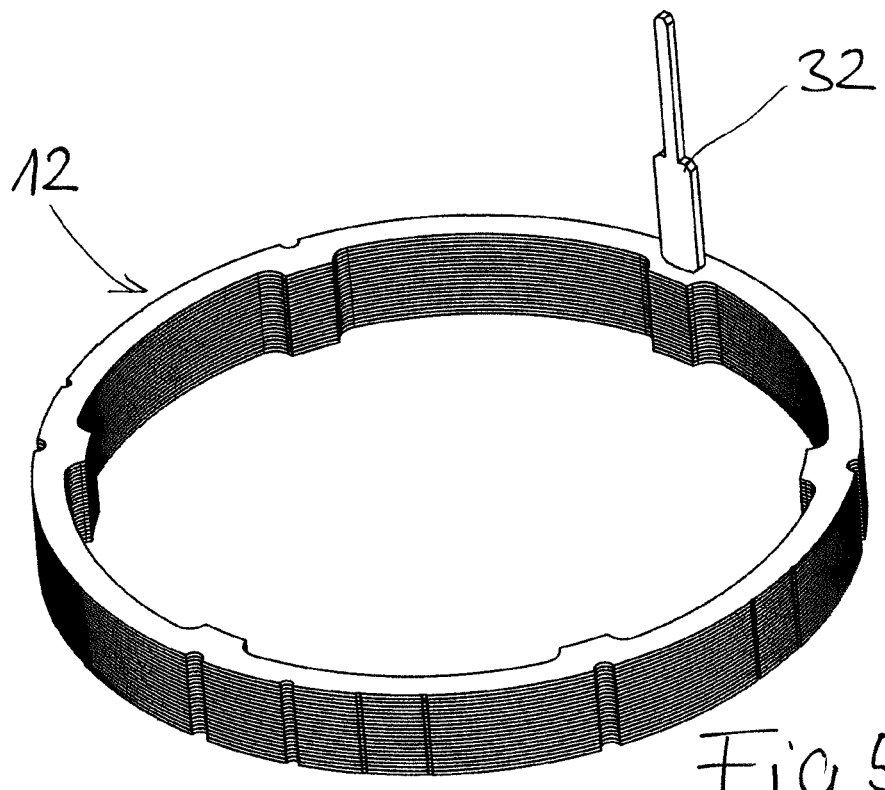
Figure 6:
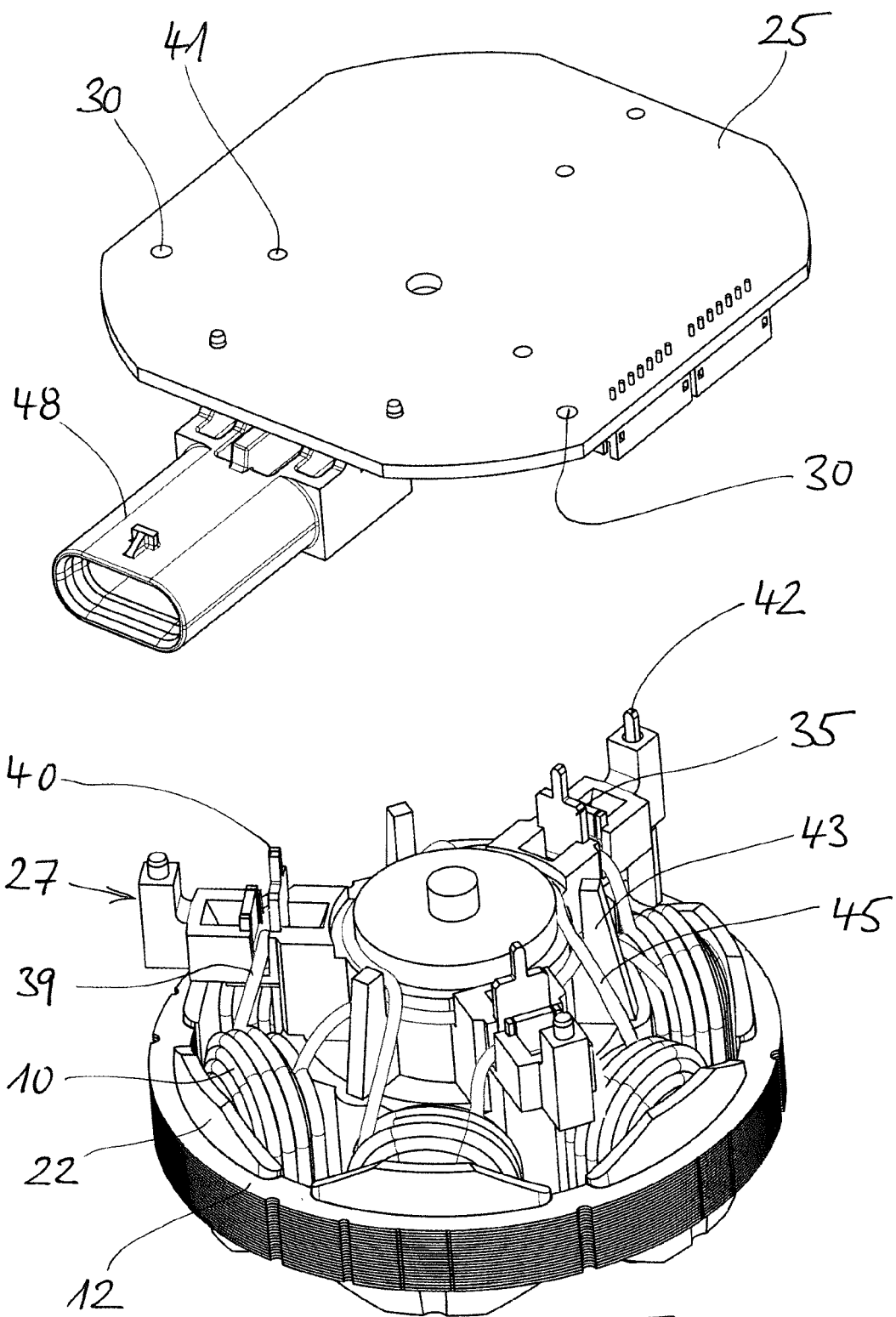
Figure 8:
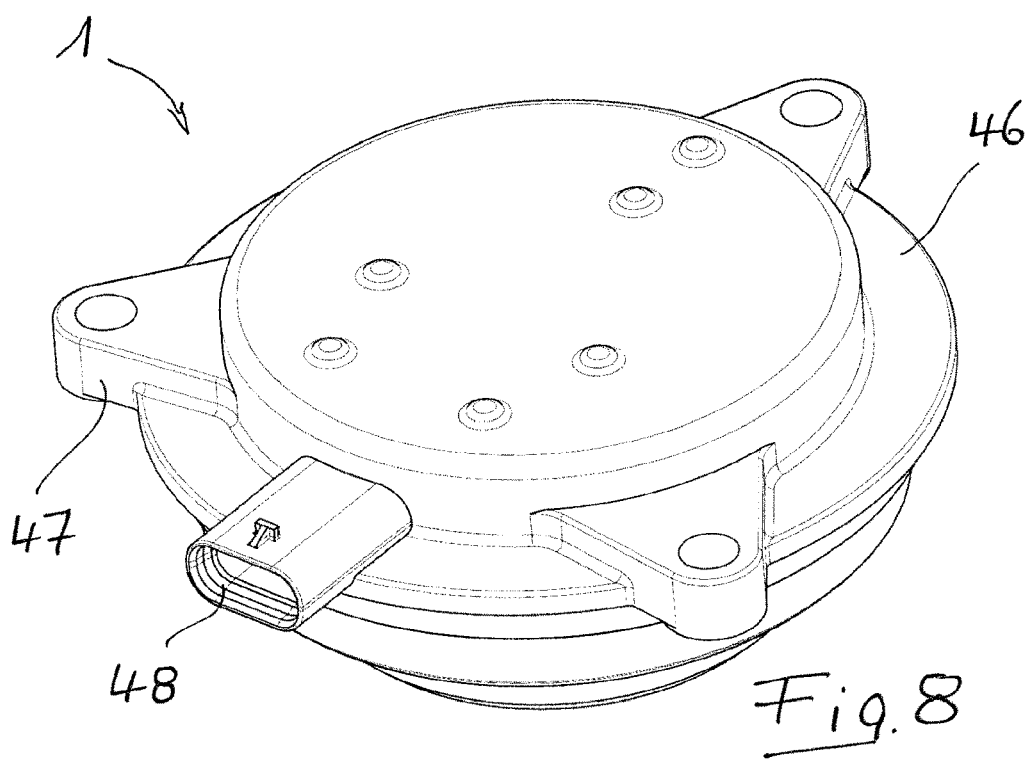

The basis of the manufacture of external stator 1 (see FIG. 8) is pole structure 3, shown in FIG. 1, consisting of a stack of laminations. This is joined together from eleven identical annularly closed pole-structure laminations 2 and individual pole-piece laminations 2' disposed between these—in respectively alternating manner—in ten layers. Six-pole pole structure 3 has six ferromagnetic pole pieces 4 disposed uniformly around axis A. These respectively comprise a radially extending winding core 5. In the radially inner region, pole pieces 4 respectively have two prolongations 6 extending in circumferential direction. In the eleven layers formed by annularly closed pole-structure laminations 2, prolongations 6 facing one another have two pole pieces 4 adjacent to one another and are respectively joined to one another via connecting webs 7; these have an only minimum radial extent. In the ten further layers, open spaces 55 exist between individual pole-piece laminations 2' (see FIG. 4). In the radially outer region, pole pieces 4 are T-shaped. Between the T-shaped heads 8 of pole pieces 4 adjacent to one another, a gap 9 of sufficient width respectively exists in order to create—from outside, using the needle-winding technique—stator windings 10 (see FIG. 5). Stress-relief notches 11 provided in the middle of T-shaped heads 8 of the pole pieces serve the possibility of defined deformation of pole pieces 2 during subsequent pressing of neutral ring 12 (see FIGS. 5 and 6).

Figure 2:
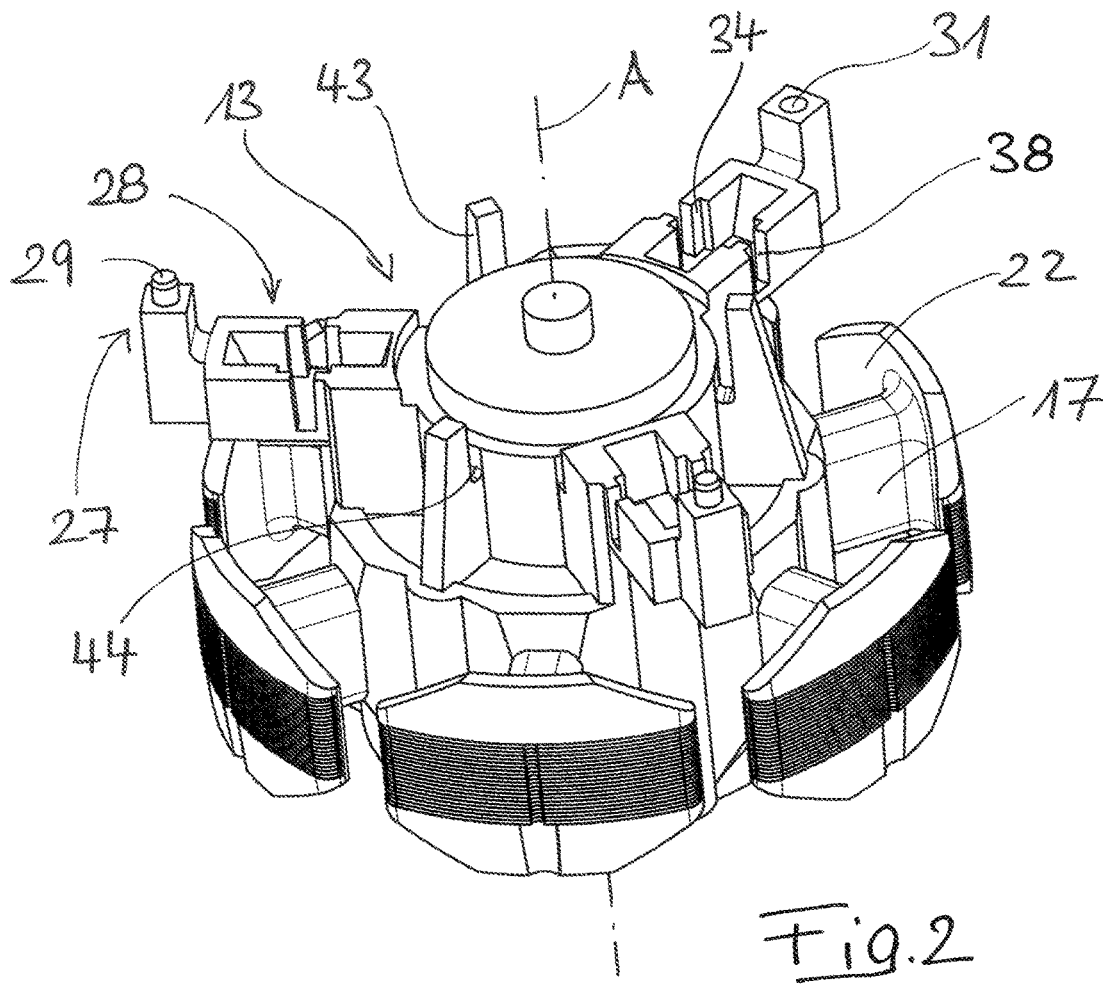
Figure 3:
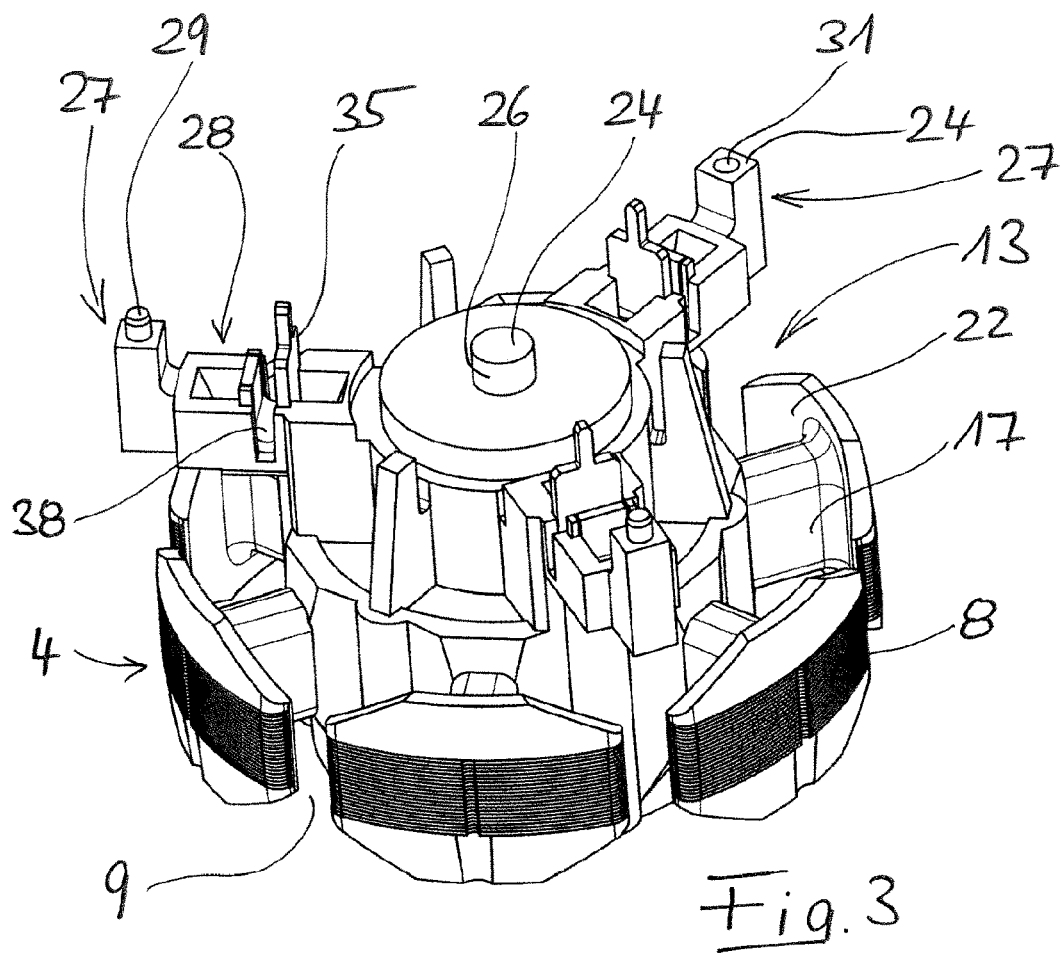
Figure 4:
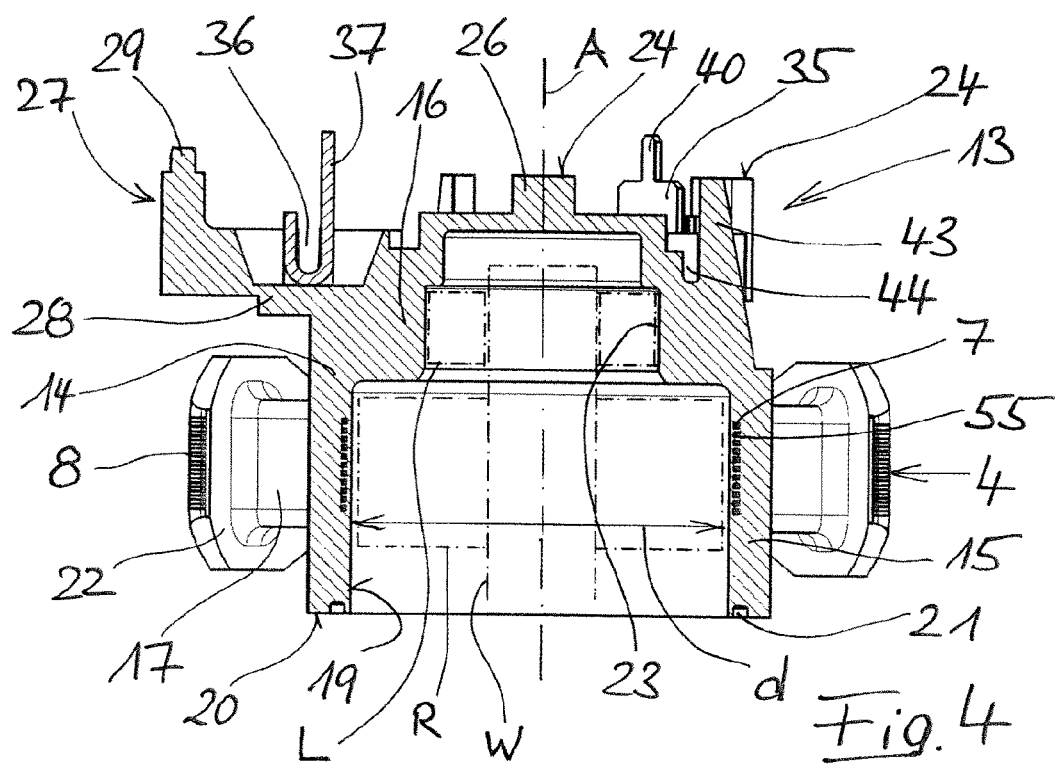

In an injection-molding mold, a complex plastic structure 13 of thermosetting epoxy is molded onto pole structure 3 by injection molding (see FIGS. 2-4). The said plastic structure 13 comprises a bushing 14, which is composed substantially of a sleeve 15 and an end piece 16 closing this in the end region as well as of winding supports 17, which are molded in one piece onto sleeve 15, protrude radially therefrom and envelop winding cores 5 of pole structure 3. The said (radially inner) prolongations 6 of pole pieces 2, just as connecting webs 7, are completely embedded in plastic structure 13 in the region of sleeve 15. Inside diameter d of the said sleeve 15 is somewhat smaller than diameter D of central opening 18 of the pole structure, and so sleeve 15 has a completely closed cylindrical inside circumferential face 19. On end face 20, sleeve 15 has an annular groove 21 serving to receive an O-ring, so that fluid-tight connection of plastic structure 13 to an adjacent structural part is possible.

In the radially outer region, winding supports 17 merge into end plates 22 molded onto them in one piece. These extend in axial as well as in circumferential direction beyond the respectively associated winding supports 17 and in the radially outer region bound the space available for receiving the respective stator winding 10. In circumferential direction, the said end plates 22 extend to the same extent as T-shaped heads 8 of pole pieces 4, so that the ends of the latter are exposed. In the radially outer region, T-shaped heads 8 of the pole pieces are completely free in any case, in order to permit optimum contact—in terms of magnetic flux—with neutral ring 12, which is formed by a subsequently pressed-on stack of annular laminations.

End piece 16 of bushing 14 of plastic structure 13 has a stepped internal structure. A seat 23 for receiving a rolling bearing used for mounting the rotor shaft is formed here. Rotor R, its rotor shaft W and bearing L received in seat 23 are merely indicated schematically in FIG. 4, since their details are not material in the present case. On the outside, plastic structure 13 is provided with various functional elements. These various bracing projections are molded onto end piece 16, each with a support face 24 for a printed-circuit board 25 having an electronic motor controller (see FIG. 6). A central bracing projection 26 among these is designed as a pin-like elevation disposed in the region of axis A. And three peripheral bracing projections 27 are respectively disposed in the end region of an associated arm 28. Two of those have centering pins 29, which interact with corresponding centering bores 30 in printed circuit board 25 in order to secure its orientation. In the region of third peripheral bracing projection 27, on the other hand, an opening 31 is provided for passage of neutral contact 32 connected to neutral ring 12. In this way, third peripheral bracing projection 27 simultaneously forms a bracing element 33 for neutral contact 32.

On each of the three arms 28, which incidentally are offset from one another by 120° respectively, and which are respectively aligned with an intermediate space between two winding supports 17, a receptacle 34 is formed for a metallic electrical contact point 35. The three contact points 35 are configured with U-shape, wherein opening 36 respectively points toward printed-circuit board 25. In alignment with the space bounded by the two limbs 37 of the respective contact point 35, associated arm 28 is provided with two notches 38, so that winding wire 39 may be inserted through the two notches 38 into U-shaped contact point 35 respectively between the two adjacent stator windings 10. One of the two limbs 37 respectively of each contact point 35 tapers to a contact pin 40. This engages in a corresponding contact bore 41 on printed circuit board 25. The same is true for the contact pin 42 provided at the end of neutral contact 32.

Respectively between two arms 28, three guide ridges 43 are molded onto end piece 16. These are respectively provided with a notch 44 made therein. Notches 44 respectively serve to receive two connecting portions 45 of winding wire 39 respectively between two in-phase stator windings 10 disposed opposite one another. These are respectively wound on a winding support 17, as is apparent in particular from FIGS. 5 and 6, specifically in the radially inner region by the outer face of sleeve 15 and in the radially outer region by the space bounded by the inside of end plate 22. Thus direct contact of winding wire 39 with pole structure 3 is obviously reliably ruled out.

Figure 7:
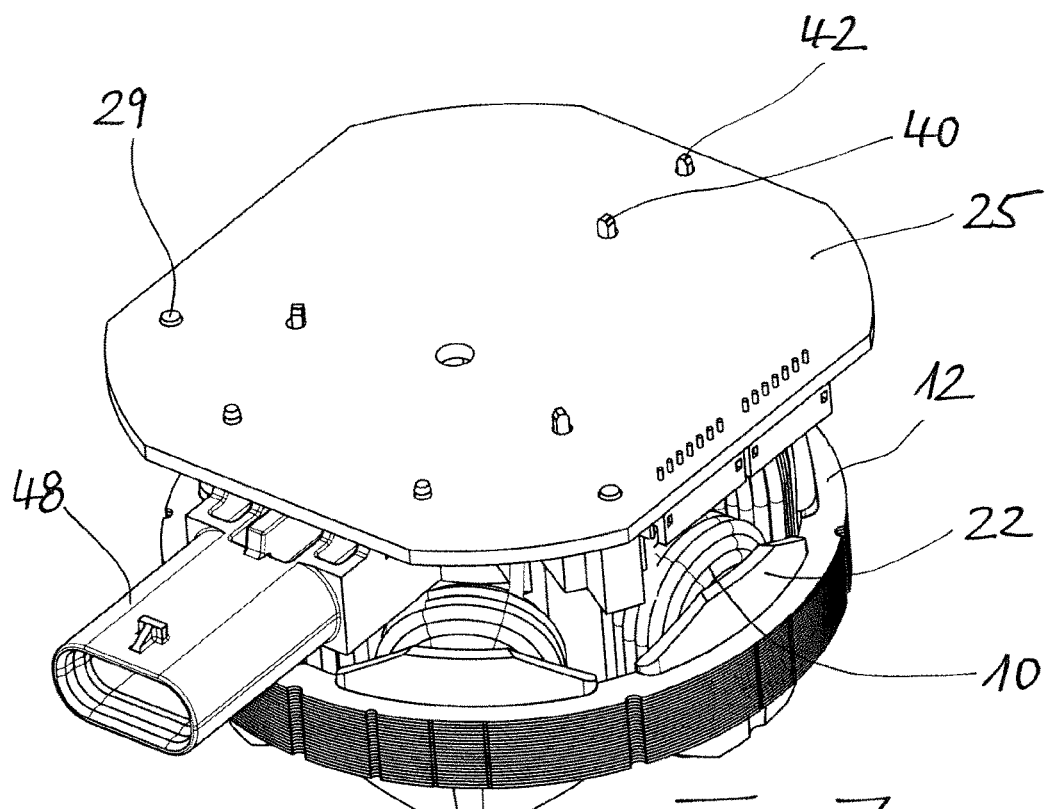

After attachment of printed-circuit board 25 and its electrical contacting with the three contact points 35 and with neutral contact 32 (FIG. 7), the corresponding assembly is overmolded in an injection-molding mold with the same thermosetting epoxy of which plastic structure 13 also consists. Hereby an external body 46 injection-molded from plastic is obtained, which is injection-molded onto the unit, fabricated up to that point and comprising pole structure 3, plastic structure 13 injection-molded onto it, contact points 35 inserted into this and stator windings 10 applied on this as well as mounted neutral ring 12 plus neutral contact 32 and electrically connected printed-circuit board 25, and in which the said structural parts (plastic structure 13 plus stator windings 10 as well as neutral ring 12 and printed-circuit board 25) are completely embedded. Three fastening tabs 47 are molded onto external body 46. Connecting bushing 48 provided on printed-circuit board 25 from the beginning on projects out of external body 46, in which it is securely anchored mechanically.

Figure 9:
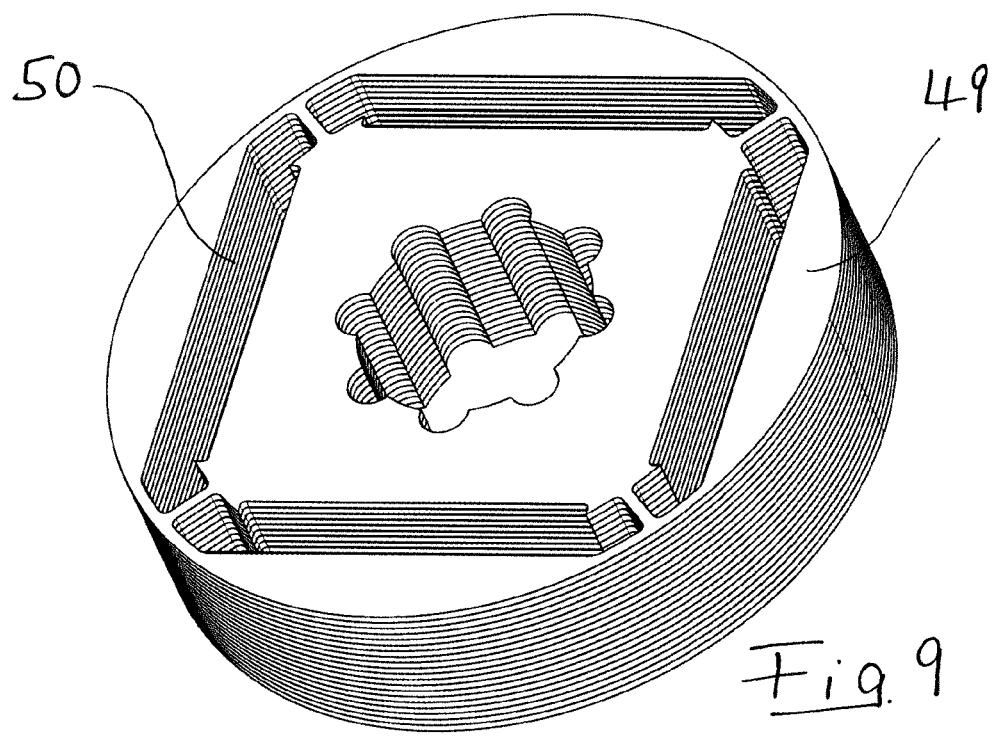
Figure 10:
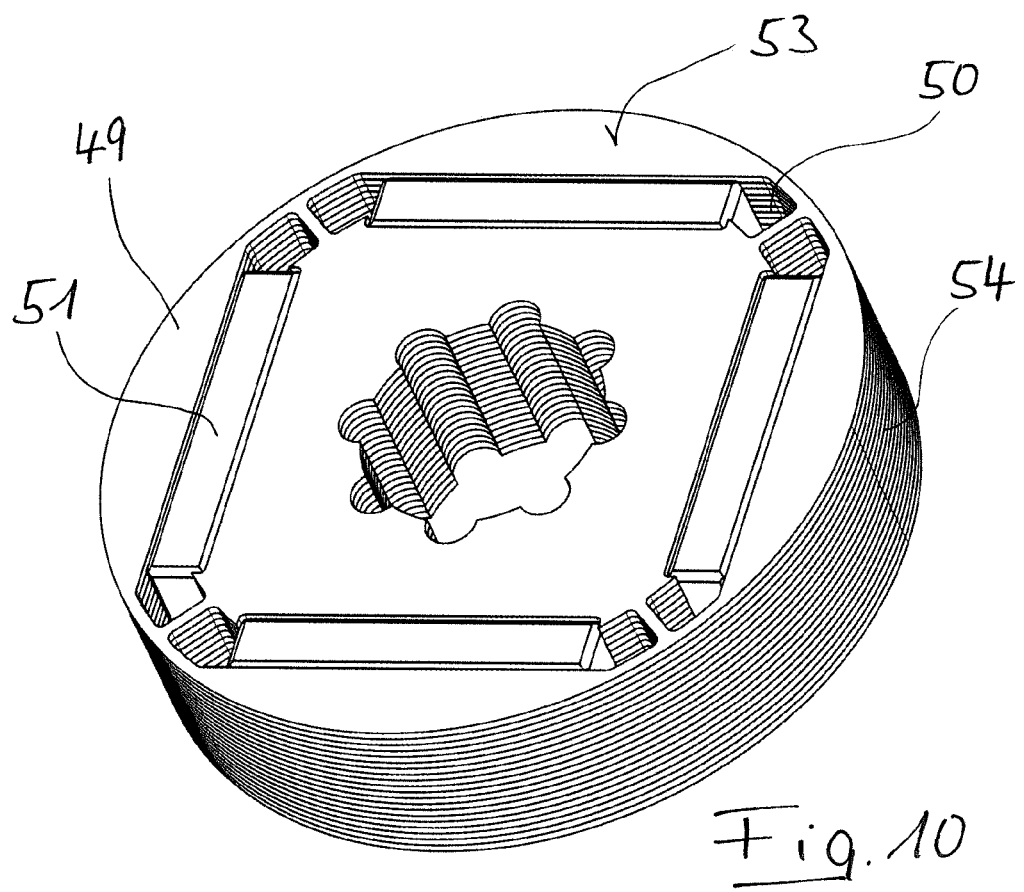
Figure 11:
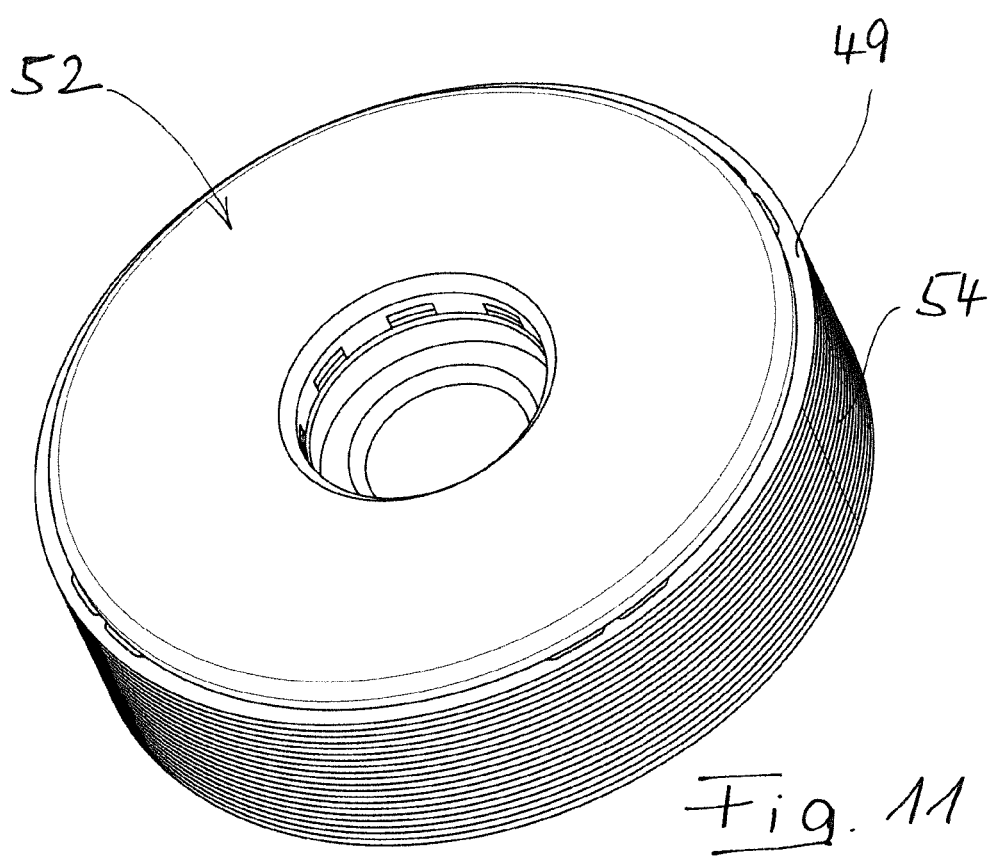

The internal rotor—disposed inside sleeve 15 and mounted to rotate around axis A—of the electric motor provided with external stator 1 according to FIGS. 1-8 is illustrated with respect to special configuration features in FIGS. 9-11. It comprises a core structure 49 consisting of a stack of laminations of ferromagnetic material, to be connected to a rotor shaft, which is not shown. This has four openings 50, into which—in square arrangement—four sintered permanent magnets 51 of NdFeB are inserted. Core structure 49 is overmolded in such a way with a plastic jacket 52 that the two end faces 53 are very largely covered and also the remaining cavities of openings 50 are filled with plastic. Nevertheless, outer circumference 54 of core structure 49 remains free.

What is claimed is:

1. An electric motor having an external stator (1) and an internal rotor mounted to rotate around an axis (A), wherein the external stator (1) comprises:
   a multiplicity of ferromagnetic pole pieces (4) disposed around the axis (A) and having winding cores (5) extending substantially radially,
   an injection-molded plastic structure (13) having winding supports (17) enveloping the winding cores (5) and a sleeve (15), which is provided with a closed inside face (19) extending radially inside the pole pieces (4), and
   stator windings (10) received on the winding supports (17), wherein the injection-molded plastic structure does not enclose the stator windings
   and the rotor (R) is disposed inside the sleeve (15),
   wherein the plastic structure (13) comprises a bushing (14), which in turn comprises the sleeve (15) as well as an end piece (16) closing this in the end region, wherein the rotor (R) is mounted in a bearing (L) disposed in the end piece (16),
   wherein the pole pieces (4) are surrounded in the radially outer region by a neutral ring (12) contacting them, and
   wherein a neutral contact (32), which is received in a bracing element (31) of the end piece (16), is connected to the neutral ring.

2. The electric motor of claim 1, wherein the plastic structure (13) consists of thermosetting epoxy.

3. The electric motor of claim 1, wherein at least two bracing projections (27), on which a printed-circuit board (25) having an electronic motor controller is fixed, are disposed on the end piece (16).

4. The electric motor of claim 1, wherein receptacles (34) for electrical contact points (35) are molded onto the end piece (16).

5. The electric motor of claim 4, wherein the receptacles (34) are respectively aligned with an intermediate space between two pole pieces (4).

6. The electric motor of claim 4, wherein the contact points (35) are configured in U-shape with one limb (37) tapering to a contact pin (40).

7. The electric motor of claim 1, wherein the pole pieces (4) are T-shaped in the radially outer region.

8. The electric motor of claim 1, wherein the winding supports (17) merge in the radially outer region into molded-on end plates (22).

9. The electric motor of claim 1, wherein the sleeve (15) is provided opposite the end piece (16) with a sealing structure for sealed attachment on a system housing.

10. The electric motor of claim 1, wherein the pole pieces (4) are part of a continuous pole structure (3), in that they are joined to one another in the radially inner region, in the region of the prolongations (6), via connecting webs (7).

11. The electric motor of claim 10, wherein the pole structure (3) consists of a stack of laminations.

12. The electric motor of claim 11, wherein only some of the laminations have connecting webs (7) and are annularly continuous.

13. The electric motor of claim 1, wherein the stator (1) is provided with an external body (46) injection-molded from plastic, which is injection-molded in situ onto the plastic structure (13), and in which the plastic structure (13) plus stator windings (10) is embedded, as are also a neutral ring (12) and a printed-circuit board (25) if such are present.

14. The electric motor of claim 13, wherein the external body (46) and the plastic structure (13) consist of compatible material.

15. The electric motor of claim 1, wherein the rotor is provided with a core structure (49) consisting of a stack of laminations.

16. The electric motor of claim 15, wherein sintered permanent magnets (51) are inserted into the core structure (49).

17. The electric motor of claim 15, wherein the core structure (49) is overmolded at least partly with a plastic jacket (52).

* * * * *